United States Patent [19]

Nakshbendi

[11] Patent Number: 5,171,442
[45] Date of Patent: Dec. 15, 1992

[54] WATER PURIFICATION APPARATUS

[76] Inventor: Ghassan F. Nakshbendi, 12 Chamberlain St., Rye, N.Y. 10580

[21] Appl. No.: 779,524

[22] Filed: Oct. 18, 1991

[51] Int. Cl.⁵ ............................................. C02F 9/00
[52] U.S. Cl. ................................. 210/256; 210/283; 210/284; 210/288
[58] Field of Search ............. 210/686, 694, 282-284, 210/288, 290, 256, 315, 338, 342

[56] References Cited

U.S. PATENT DOCUMENTS

| | | | |
|---|---|---|---|
| 3,245,537 | 4/1966 | Burgess | 210/284 |
| 4,515,692 | 5/1985 | Chandler et al. | 210/288 |
| 4,540,489 | 9/1985 | Barnard | 210/338 |

*Primary Examiner*—Ivars Cintins
*Attorney, Agent, or Firm*—Charles E. Baxley

[57] ABSTRACT

Water purification apparatus includes a tank having an opening, a stopper removably engaging the opening in watertight relationship therewith, the stopper having a raw water passage in communication with the exterior of the tank and with the interior of the tank. A pure-water passage is in communication with the interior of said tank and an activated carbon column within said tank and in communication with said pure-water passage. The tank also containing a mixed bed ion exchange resin exterior to the activated carbon column and in communication with the raw water passage and with said activated carbon column. Raw water enters the tank through the stopper, passes through the resin and then through the activated carbon and exits the apparatus through the pure-water passage. A method for purifying water includes the steps of passing water through a mixed bed ion exchange resin and then through an activated carbon column.

2 Claims, 2 Drawing Sheets

WATER PURIFICATION APPARATUS

BACKGROUND OF THE INVENTION

This invention relates to a water purification apparatus and to a water purification method carried out with the aid of the apparatus.

The inventive apparatus is compact and includes simple elements all of which are readily available at reasonable cost.

The inventive apparatus is simple and efficient in operation and is easily disassembled to service and rejuvenate the same.

Important objects of the present invention are to provide a water purification apparatus and method attaining the foregoing advantages.

The manner in which the invention attains the foregoing objects and advantages will appear hereinafter.

SUMMARY OF THE INVENTION

Water purification apparatus embodying the invention comprises a tank having an opening at the top. A stopper removably engages the opening in watertight threaded relationship therewith, and the stopper has a raw water passage in communication with the exterior of the tank and with the interior of the tank, and a pure-water passage in communication with the interior of the tank and the exterior of the tank. An activated carbon column is within the tank and in communication with the pure-water passage through a riser tube. The tank also contains a mixed bed ion exchange resin exterior to the activated carbon column and in communication with the raw water passage and with the activated carbon column, whereby raw water enters the tank through the stopper, passes through the resin and then through the activated carbon, thus becoming pure water which exits the tank through the pure-water passage.

The tank is cylindrical with a vertical axis and the activated carbon column is on the axis. The mixed bed ion exchange resin occupies substantially the entirety of the tank except for the activated carbon column. The apparatus further includes a base furnishing a stand for holding the tank with its axis vertical.

The inventive method for purifying water comprises the steps of passing water through a mixed bed ion exchange resin and then passing the water through an activated carbon column. The step of passing the water through the mixed bed ion exchange resin is performed in a downward direction and the step of passing the water though the activated carbon column is performed in an upward direction.

DESCRIPTION OF THE DRAWINGS

The invention can be seen in drawings which accompany and are made part hereof and in which.

DESCRIPTION OF THE INVENTION

Figure 1:
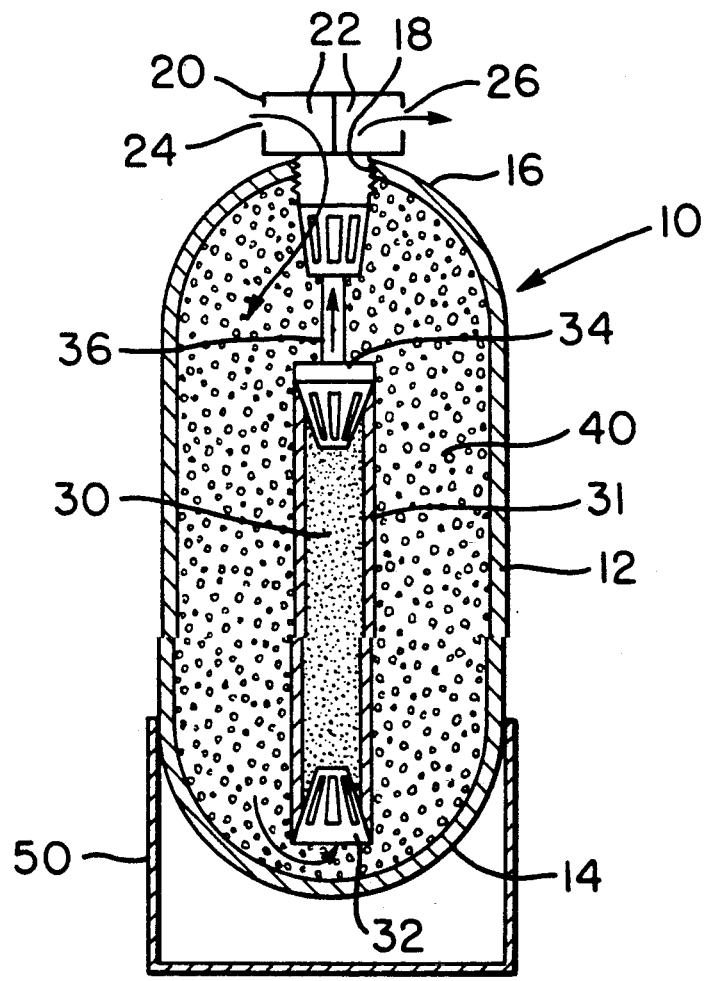
FIG. 1 is a somewhat schematic view in section of a preferred embodiment of a water purification apparatus according to my invention.

FIG. 1 shows a water purification apparatus that is a preferred embodiment of the invention. The apparatus includes a tank 10 having a cylindrical body portion 12 defining a tank axis, a lower closed end portion 14 that is externally convex and merges with body portion 12 and an upper end portion 16 that is externally convex and also merges with body portion 12. Portions 12, 14 and 16 are coaxial and upper end portion 16 is provided with a 2.5 inch (6.35 cm) diameter threaded opening 18.

The apparatus further comprises a stopper 20 in threaded engagement with threaded opening 18 and having wrenching flats 22 whereby stopper 20 can be assembled with or removed from tank 10. Stopper 20 provides a raw-water inlet 24 and a pure-water outlet 26. Waterlines (not shown) are attachable to inlet 24 and outlet 26 and means (not shown) are provided for causing water to travel from inlet 24 to outlet 26.

Figure 2:
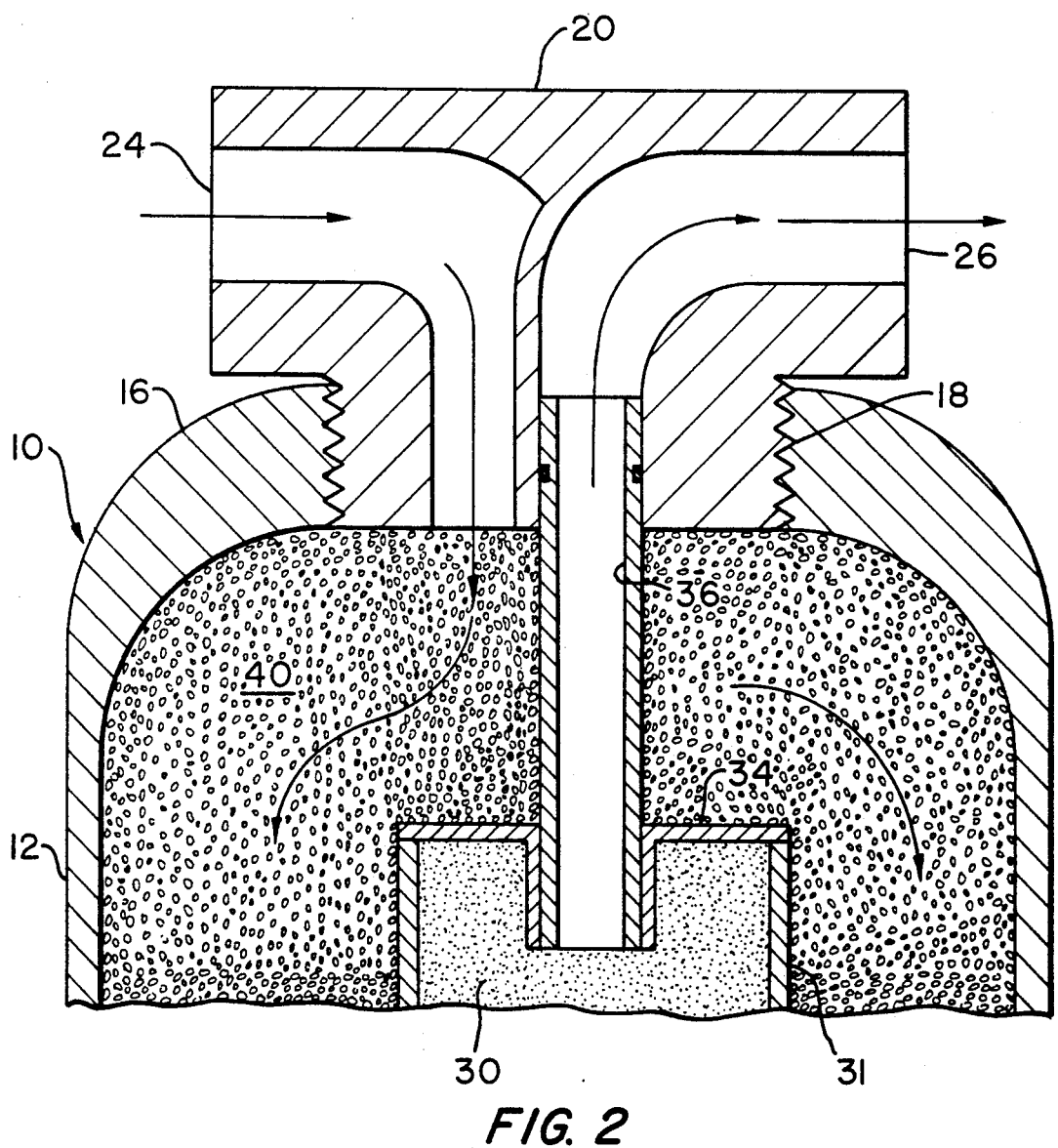
FIG. 2 is an enlarged schematic view in section of a stopper according to the invention.

Fastened to stopper 20 and within tank 10 is an activated carbon column 30 within a tube 31 that is sufficiently small to be passed through threaded opening 18. Column 30 has a lower water inlet end 32 which is located within closed end portion 14 of tank 10 and an upper end 34 that is connected to stopper 20 by a riser tube 36 which, within stopper 20, is in open communication with pure-water outlet 26. The arrangement of stopper 20 is seen also in FIG. 2.

The part of tank 10 not occupied by stopper 20 is occupied by a mixed bed ion exchange resin 40.

The water flow path through the apparatus enters inlet 24 and proceeds therefrom through a first passage (FIG. 2) in stopper 20 into ion exchange resin 40 and downwardly therethrough and into water inlet end 32 of column 30 and thence upwardly through activated carbon column 30 to upper end 34 and from thence into riser tube 36. The water (now purified) reenters stopper 20, but this time enters a second passage (FIG. 2) that is in communication with pure-water outlet 26.

Raw-water inlet 24 and pure-water outlet 26 are provided with fittings (not shown) whereby water may be passed through the apparatus and purified thereby.

The apparatus also may include a base 50 which snap-fits over lower closed-end portion 14 of tank 10. Base 50 provides a stand for holding tank 10 with its axis vertical.

The following tanks have been successfully used in the present invention:
(a) Made by Structural Fibers (an Essef Co.) of Chardon, Ohio.
 6 inches (21.2 cm) diameter by 18 inches (63.7 cm) height;
 10 inches (25.4 cm) diameter by 19 inches (66.2 cm) height;
(b) Made by FRP Material
 6 inches (21.2 cm) diameter by 18 inches (63.7 cm) height;
 9 inches (23.9 cm) diameter by 18 inches (63.7 cm) height; and
(c) Made by Poly Glass Material
 6 inches (21.2 cm) diameter by 18 inches (63.7 cm) height;
 9 inches (23.9 cm) diameter by 18 inches (63.7 cm) height.

Mixed bed ion exchange resin has been successfully used herein as made by Sybron Chemicals Inc. of Birmingham, N.J., under the designation "High Purity Mixed Bed NM-72HP."

Activated carbon has been successfully used herein as made by Calgon Carbon Corp. of Pittsburgh, Pa., under the designation "High Purity, Acid Washed Type CPG 20X 50."

An electronic total dissolved solids monitor has been successfully used herein as made by Touch-Flo Manufacturing Co., Burbank, Calif.

A conductivity test light has been successfully used herein as made by Clack Corporation of Windsor, Wis., under the name "Nesilites."

Plastic components, such as molded heads, molded basket riser tubes and molded basket distributors have been successfully used herein as made by Matt-son Inc. of Barrington, Ill., and/or Clack Corporation of Windsor, Wis.

The invention in both its apparatus and method aspects puts together in a compact cylindrical tank a mixed bed ion exchange (or deionizing) resin, and an activated carbon column and passes the raw water through the mixed bed ion exchange resin and then through the activated carbon column. This gives (a) demineralized water free from ionized metals and minerals, thanks to the mixed bed ion exchange resin and (b) water from which organics have been absorbed by the activated carbon, thus getting rid of offensive taste and odors.

The result is pure water, without taste and odors, obtained simply and reasonably at reasonable cost.

The apparatus has a life between servicings dependent on the total soluble solids in the water. The operative components of the apparatus can be replaced simply and inexpensively when exhausted, either in situ or at a dealership.

It is apparent that the invention well attains the stated objects and advantages among others.

The disclosed details are exemplary only and are not to be taken as limitations on the invention except as such details may be included in the appended claims.

What is claimed is:

1. Water purification apparatus comprising a cylindrical tank having a vertical axis, an internally-threaded opening at the top end of said tank, a stopper in removable threaded engagement with said opening in watertight relationship therewith, said stopper having a first, raw water passage in communication with the exterior of said tank and with the interior of said tank, and a second, pure-water passage in communication with the interior of said tank and the exterior of said tank and an activated carbon column within said tank and in communication with said pure-water passage, said tank also containing a mixed bed ion exchange resin exterior to said activated carbon column and in communication with the raw water passage and with said activated carbon column, whereby raw water enters said tank through said raw water passage of said stopper, passes downwardly through said resin and then upwardly through said activated carbon and exits said apparatus through said pure-water passage of said stopper, wherein said activated carbon column is on said axis and said mixed bed ion exchange resin occupies substantially the entirety of said tank except for said activated carbon column, and wherein said activated carbon column is joined to said pure-water passage of said stopper by a riser tube.

2. Apparatus according to claim 1 further including a base furnishing a stand for holding said tank in snap fit fashion with its axis vertical.

* * * * *